United States Patent [19]
Bach et al.

[11] Patent Number: 5,811,818
[45] Date of Patent: Sep. 22, 1998

[54] SYSTEM, DEVICE AND PROCESS FOR INSPECTION OF A THERMAL NEUTRON ABSORPTION WALL

[75] Inventors: Pierre Bach, Maisons Alfort; Philippe Gosset, Jouy-en-Josas, both of France

[73] Assignee: Atea, Société Atlantique de Techniques Avancées, Carquefon Cedex, France

[21] Appl. No.: 709,489

[22] Filed: Sep. 6, 1996

[30] Foreign Application Priority Data

Sep. 15, 1995 [FR] France ................................... 95 10848

[51] Int. Cl.⁶ .............................. G01T 3/00; G01N 23/09
[52] U.S. Cl. ................................. 250/390.01; 250/359.1; 250/390.06
[58] Field of Search ........................ 250/390.01, 390.04, 250/391, 358.1, 359.1, 390.06, 390.1

[56] References Cited

U.S. PATENT DOCUMENTS

| | | |
|---|---|---|
| 2,967,937 | 1/1961 | McKay ................................ 250/309.06 |
| 3,050,624 | 8/1962 | Janner . |
| 4,038,548 | 7/1977 | Charlton ................................ 250/357.1 |
| 4,243,886 | 1/1981 | Untermyer, II ..................... 250/390.01 |
| 4,277,680 | 7/1981 | Rodriguez et al. ................... 250/358.1 |
| 4,565,926 | 1/1986 | Crane ................................... 250/390.04 |
| 5,002,721 | 3/1991 | Bernard et al. . |
| 5,268,952 | 12/1993 | Tarvainen ................................. 378/59 |
| 5,300,781 | 4/1994 | DiMartino ......................... 250/390.06 |

FOREIGN PATENT DOCUMENTS

| | | |
|---|---|---|
| 0 307 302 A1 | 3/1989 | European Pat. Off. . |
| 2079926 | 11/1971 | France ................................ 250/390.06 |
| 2 511 907 | 3/1983 | France . |
| 2 680 909 B1 | 3/1993 | France . |
| 33 33 410 A1 | 4/1985 | Germany . |

Primary Examiner—Edward J. Glick
Attorney, Agent, or Firm—Pollock, Vande Sande & Priddy

[57] ABSTRACT

System, device and process for inspection of a thermal neutron absorption wall. The device comprises a fast neutron source and an arrangement for thermal neutron detection comprising at least one pair of oblong, substantially parallel thermal neutron detectors placed side by side, and substantially perpendicular to the direction of displacement of the device along the neutron absorption wall.

8 Claims, 4 Drawing Sheets

SYSTEM, DEVICE AND PROCESS FOR INSPECTION OF A THERMAL NEUTRON ABSORPTION WALL

TECHNICAL FIELD

This invention concerns a system for inspecting a thermal neutron absorption wall. It also concerns processes for inspecting this type of wall using the system according to the invention.

In particular, inspecting a neutron absorption wall involves inspecting the absorption quality of the wall, detecting any defects in the wall, locating these defects and determining their size and magnitude.

Applications of the invention particularly include the inspection of walls of used nuclear fuel storage or transport compartments.

The walls of these compartments are inspected particularly before the compartments are put into service, and then periodically during their operative life.

BACKGROUND OF THE INVENTION

In the nuclear industry, assemblies of irradiated fuels are stored in racks that contain compartments that are usually polygonal or square shaped. This type of rack is described, for example, in FR-A-2 680 909.

Racks may be submerged, for example, in a pool containing water to which a neutron absorber has been added.

Compartments have metal walls and a material capable of absorbing thermal neutrons, i.e., neutrons which have an energy of about one electron-volt. In the remainder of this description, this type of material is referred to as a "neutron-absorbing" material. The walls of compartments may be made directly of a neutron-absorbing material, such as a cadmium alloy or steel-containing boron. Alternatively, they may consist of two stainless steel support sheets, with the neutron-absorbing material inserted between them.

This subject is described in FR-A 2 680 909 and FR-A-2 551 907.

FIG. 1 shows the cross-sectional view of a known system for the inspection of a storage compartment wall. The system comprises a steel block 10, the dimensions of which are adjusted to suit the dimensions of a compartment 12 so that block 10 can slide inside the compartment along the walls perpendicularly to the plane of the figure.

The steel block comprises an isotopic fast neutron 14 source 252 made of californium in the center, and four cylindrically-shaped thermal neutron detectors 16a, 16b, 16c and 16d placed around the edges of the steel block facing the walls 18a, 18b, 18c, 18d of compartment 12.

Fast neutrons are neutrons with an energy with a magnitude of about one Megaelectron-volt. Detectors 16a, 16b, 16c and 16d are substantially insensitive to these fast neutrons, and walls 18a, 18b, 18c, 18d equipped with neutron-absorbing material absorb almost no fast neutrons, because their energy is too high.

Fast neutrons emitted by the isotopic source 14 pass through steel block 10 which acts as a neutronic decelerator to improve the thermalization efficiency in the region of the compartment, possibly detectors 16a, 16b, 16c, 16d and walls 18a, 18b, 18c, 18d, to reach a thermalizing environment 20 surrounding compartment 12. For example, this may be water with added boron or any other material based on hydrogen or carbon.

In the thermalizing environment, fast neutrons lose their energy and are converted into thermal neutrons that the neutron-absorbing material is capable of stopping, and the neutron detectors are capable of-detecting. The energy of thermal neutrons is only of about one electron-volt.

Thermal neutrons diffuse in all directions, and therefore also towards the inside of compartment 12. If there is a weakness in the neutron-absorbing material in walls 18a, 18b, 18c or 18d, or if there is no neutron-absorbing material, the thermal neutrons will not be absorbed and will therefore penetrate into the compartment where they will be detected by detectors 16a, 16b, 16c, 16d. U.S. Pat. No. 4,243,886 may be referred to for further information on this subject.

The approximate location of the weakness or defect in the wall can be determined from records of neutrons made by one of the detectors.

The use of an isotopic source causes radiation shielding problems, particularly during transport and when block 10 is transferred into the compartments.

Block 10 is moved by sliding within the compartment along walls 18a, 18b, 18c, 18d, in order to explore them.

FIG. 2 schematically shows the sliding of block 10 inside compartment 12 in a simplified manner, and shows the position of detectors 16a, 16b, 16c, 16d. These detectors are usually cylindrically-shaped and extend along a direction X, shown by an arrow, parallel to the walls of compartment 12.

When block 10 moves inside the compartment, the detectors describe a trajectory as shown in a dashed line for detector 16a in FIG. 2.

FIG. 3 is drawn to an arbitrary scale and shows the signal recorded by one of the detectors, for example detector 16a, when it passes in front of a defect 24 on wall 18a of the compartment, in which the absorbent material is partially or completely missing. The curve in FIG. 3 shows a displacement of the detector from the bottom towards the top of the compartment, i.e. in the direction of arrow X in FIG. 2.

The signal curve includes regions 32 and 34 in which the detector has not yet reached the region of the defect 24 or has left this region.

Parts 36 and 40 of the curve correspond to a range of movement of the detector for which increasing (36) or decreasing (40) portions of the detector are facing the defect.

In part 36, the signal amplitude starts to increase when the end 26 of detector 16a reaches the defect 24. In part 40, the signal amplitude starts to decrease when the opposite end 28 of detector 16a starts to leave the region containing the defect.

Part 38 of the curve corresponds to the maximum amplitude signal when detector 16a is facing the defect 24.

The slopes of parts 36 and 40 of the curve are slight, and it is impossible to precisely determine the position and magnitude of the defect in the wall.

SUMMARY OF THE INVENTION

One purpose of this invention is to propose a perfected system for inspection of a neutron absorption wall capable of accurately determining in particular the location and/or magnitude of a defect in this type of wall.

Another purpose is to propose a system for inspection of the thickness of the neutron-absorbing material in a wall.

Another purpose is to propose an inspection system capable of eliminating many radiation shielding problems.

Another purpose of the invention is to propose processes for inspecting a wall using the inspection system.

DESCRIPTION OF THE INVENTION

In order to achieve the purposes mentioned above, one objective of the invention is a system for inspecting an absorption wall containing a thermal neutron-absorbing material, comprising:

a detection device comprising a neutron source capable of emitting fast neutrons and thermal neutron detection means capable of outputting detection signals, the device being placed facing the first side of the wall and capable of being moved in one direction of displacement along the wall, a thermalizing environment located on one side of the wall opposite the first side, to convert fast neutrons to thermal neutrons, means for processing detection signals, characterized in that the detection means comprise at least one pair of oblong, substantially parallel thermal neutron detectors placed side by side, substantially perpendicular to the direction of displacement, each detector being capable of outputting detection signals to signal processing means to create a wall inspection signal.

Use of a pair of detectors placed in the manner defined above can generate an inspection signal from the detection signals, from which it is possible to precisely deduce the existence, magnitude and location of a defect in the wall.

With the system according to the invention, it is also possible to determine the quality and/or thickness of the neutron-absorbing material in the wall.

It is considered that the detectors are placed side by side when the distance separating them is of the same order of magnitude as their cross-section. For example, cylindrical detectors with an external diameter of about one centimeter may be a few centimeters apart.

In particular, adjusting the distance between detectors can adjust the resolution of the detection device to determine the position of a defect in the wall, if there is one.

According to one aspect of the invention, processing means may include an adder which adds detection signals output by each detector in the pair of detectors, to form an inspection signal that is a function of the sum of the detection signals.

By taking the sum of the detection signals from each of the two detectors in each pair of detectors, a wall inspection signal is obtained that is particularly suitable for inspection of the thickness and absorption quality of the neutron-absorbing material in the wall.

According to another aspect of the invention, signal processing means include a subtractor which subtracts the detection signals output by each detector in the pair of detectors, to form an inspection signal that is a function of the difference between the detection signals.

A subtractor may be present with or without an adder.

When an inspection signal equal to the difference between the detection signals is recorded, it is observed that the detection signal shows two discontinuities with opposite signs, for every detected defect in the wall. These discontinuities are very localized, and can be used to precisely determine the size and location of every detected defect.

In order to further increase the resolution and efficiency of the inspection system, the detection device may be equipped with a fast neutron diffuser placed between the fast neutron source and thermal neutron detectors. The neutron diffuser can increase the number of fast neutrons within a "useful angle". The vertex of the useful angle is the center of the fast neutron source and intercepts the two fast neutron detectors in each pair of detectors.

In a particularly advantageous embodiment of the system according to the invention, the neutron source may be a fast neutron generator. A fast neutron generator is a device capable of sending neutrons in response to electrical pulses supplied to it. Therefore, this type of generator is distinguished from an "isotopic" neutron source which continuously supplies neutrons. Compared with this type of isotopic source, a neutron generator facilitates and simplifies radiation shielding measurements, particularly when installing or removing the detection device from the compartment to be inspected.

The invention also relates to an inspection device to be used in the system described above.

The device includes a fast neutron source and thermal neutron detection means, preferably adjacent to at least one detection face. The device can also be moved along the wall along one direction of displacement, and with the detection surface facing the wall.

According to the invention, the detection means comprise at least one pair of oblong, substantially parallel thermal neutron detectors placed side by side, substantially perpendicular to the direction of displacement of the device along the wall.

The device may include several detection faces, each equipped with one or several pairs of detectors. In particular, for the inspection of nuclear fuel storage compartments, the device may include one detection face for each wall in the compartment, in order to check all the walls simultaneously.

The cross-section of the device may advantageously be adapted to the internal cross-section of a fuel storage compartment, in parallel to the thermal neutron detectors, so that it can be moved along the compartment walls inside the compartment.

In particular, the shape and dimensions of the cross-section of the device are adjusted so that it can slide within the compartment.

The invention also includes processes for inspecting a wall using a system as described above.

According to a first process, the detection device is moved along the wall, an inspection signal proportional to the sum of the detection signals from the two detectors is recorded, as a function of the position of the detection device on the wall, and the inspection signal is compared with a reference signal to define the thickness of the neutron absorbing material.

According to another process, the detection device is moved along the wall, an inspection signal proportional to the difference between the detection signals is recorded as a function of the position of the detection device on the wall, the position of a pair of possible discontinuities in the inspection signal is measured, characterizing the limits of each defect in the material and/or the distance between these discontinuities in the signal.

BRIEF DESCRIPTION OF THE DRAWINGS

Other characteristics and advantages of this invention will become more evident from the following description, made with reference to the attached drawings, given for illustration purposes.

DETAILED DESCRIPTION OF PREFERRED EMBODIMENTS

Figure 4:
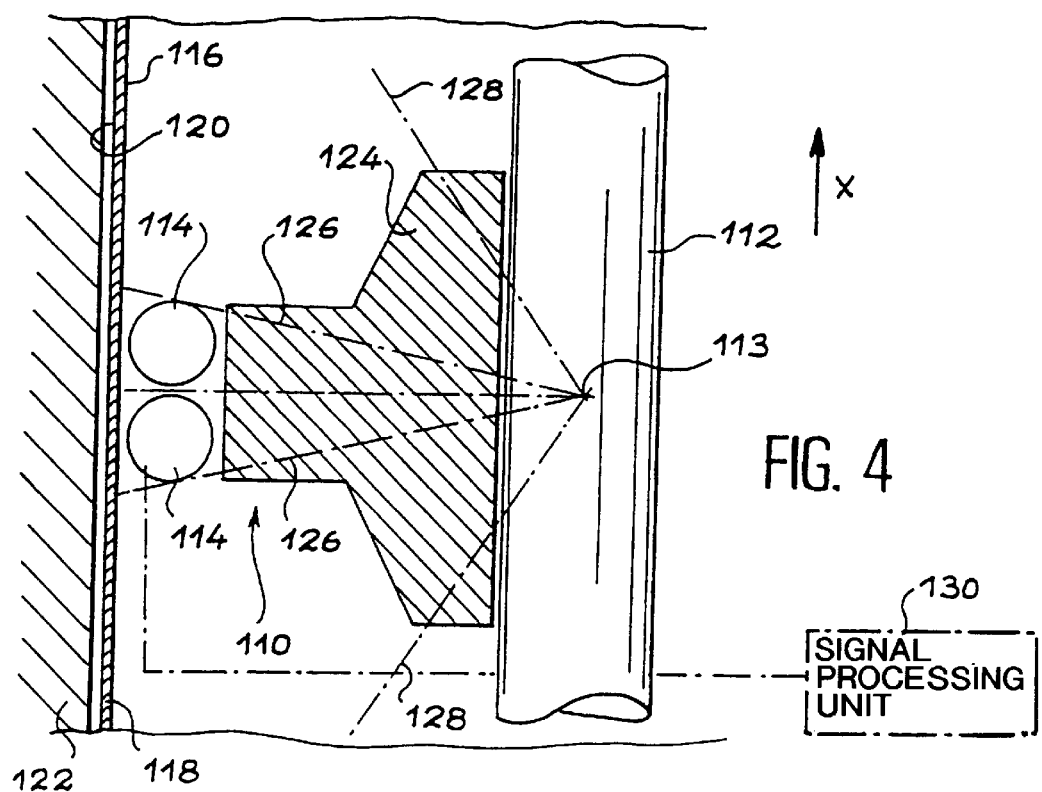
FIG. 4 shows an example of a wall inspection system according to the invention.

As shown in FIG. 4, the system for the inspection of an absorption wall comprises a detection device 110 with a fast neutron source 112 and a pair of thermal neutron detectors 114.

For example, the neutron source 112 may be a GENIE type neutron generator marketed by the SODERN Company. Neutron detectors are of the $BF_3$ or $He_3$ type.

Source 112 and detectors 114 are placed on one side 118 of a wall 118 to be inspected. The wall 116 includes a neutron-absorbing material such as a cadmium alloy or steel with added boron.

There is a thermalizing environment 122 on side 120 of wall 118, which is opposite to side 116. For example, this environment may consist of water with added boron or a material block rich in hydrogen atoms, such as polyethylene.

Fast neutrons emitted by the source pass through detectors 114 and wall 118 without being detected. Their energy is between about 1 and 14 MeV. When fast neutrons reach the thermalizing environment 112, they will be converted by interaction with the light atoms in this environment, into neutrons with an energy of about 1 electron-volt. These neutrons are called thermal neutrons, and then diffuse in all directions and particularly towards detectors 114.

Since the wall contains a neutron-absorbing material that stops thermal neutrons, only a very small number of these neutrons is detected in detectors 114. However, when the wall contains a weakness or a defect in the neutron-absorbing material, the number of neutrons which pass through it and reach the detectors will increase.

The detection device 110 advantageously includes a metal diffuser 124 placed between the source 112 and detectors 114.

This diffuser 124 increases the number of fast neutrons in the useful solid inspection angle 126, by multiple neutron diffusion. This useful angle intercepts fast detectors 114 in the pair of detectors, and its vertex is the center 113 of the source 112. It is shown in FIG. 4 in chain-dotted lines.

The part of the diffuser located outside the useful angle 126 and placed within the limits of the discontinuous lines 128 can also increase neutrons within the useful angle 126 by a multiple diffusion effect.

Another function of the diffuser is to decelerate fast neutrons emitted by the source, by diffusion, to improve their thermalization within the environment 122 close to wall 118. For example, the energy of the fast neutrons changes from the order of 14 MeV at the time of their emission by source 112 to an energy of between a few kiloelectron-volts and 1 meV. The entire source, diffuser and detectors may be installed in a frame (not shown), to facilitate movement of the detection device 110 along the wall 118.

Detectors 114 are preferably laid out so that they can be positioned as close as possible to the wall 118 in order to increase measurement precision.

A signal processing unit 130, shown schematically, is electrically connected to detectors 114. It contains detection signals detectors. The detection signals from the two detectors are either added together or subtracted from each other to form inspection signals.

Figure 5:
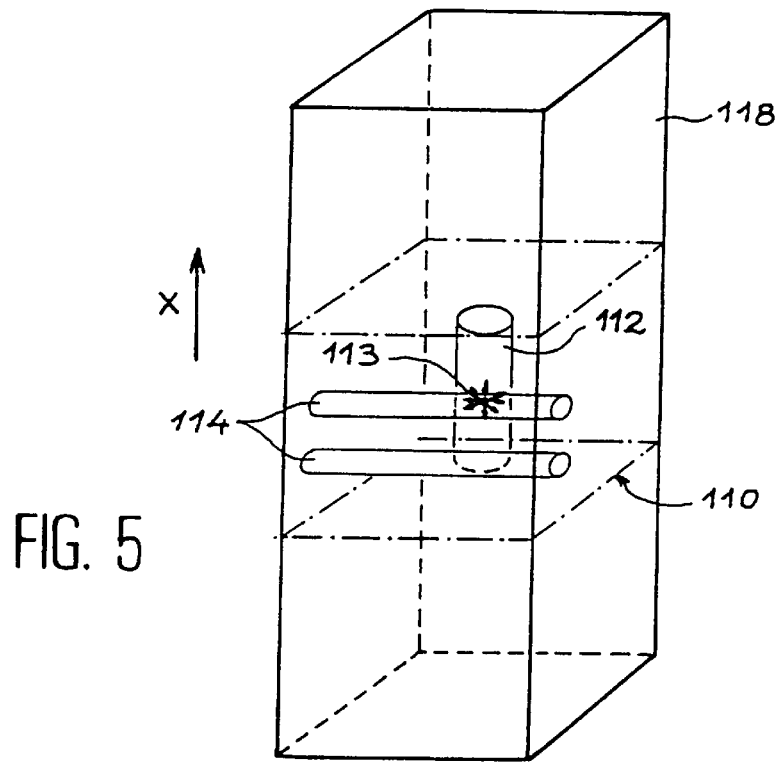
FIG. 5 is a simplified schematic view that shows the layout of thermal neutron detectors in the system with respect to the walls of a compartment, and with respect to the neutron source.

FIG. 5 shows in a simplified manner the relative position of the source and detectors with respect to a wall in a storage compartment to be inspected. The detection device 110, the housing of which is shown schematically in chain-dotted lines, has a cross-section corresponding to the inside shape of the compartment for which the walls are to be inspected, i.e. square in the case shown in the figure. Therefore, the device can slide in the compartment walls along direction X identified by an arrow in FIG. 5.

For example, detectors 114 may be cylindrically shaped with a length of 200 mm and an outside diameter of 20 mm. They are placed perpendicularly to the direction along which detection device 110 slides, i.e. perpendicular to direction X.

Detectors 114 are placed so that they are adjacent to a detection face of the device housing, and therefore close to wall 118 to be inspected. They are placed parallel to each other and are separated by a small distance. In the case shown in this example, the detectors are 40 mm apart.

The source 112 is also cylindrically shaped. Its center 113 is contained in a median plane passing between detectors 114. When the detection device slides in direction X along wall 118, for example from the bottom towards the top, this wall can be scanned in order to inspect it. However, the device may be equipped with several pairs of detectors facing other compartment walls at the same time, in order to inspect several walls simultaneously.

Figure 1:
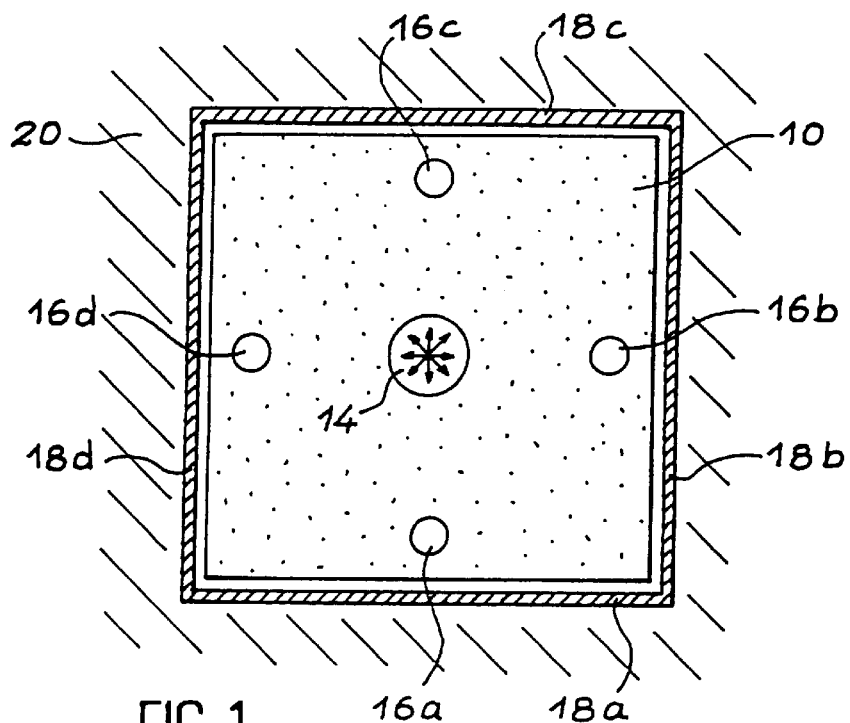
FIG. 1, which has already been described, is a schematic section of a nuclear fuel storage compartment in which a device has been placed for the inspection of compartment walls in accordance with the prior art.
Figure 2:
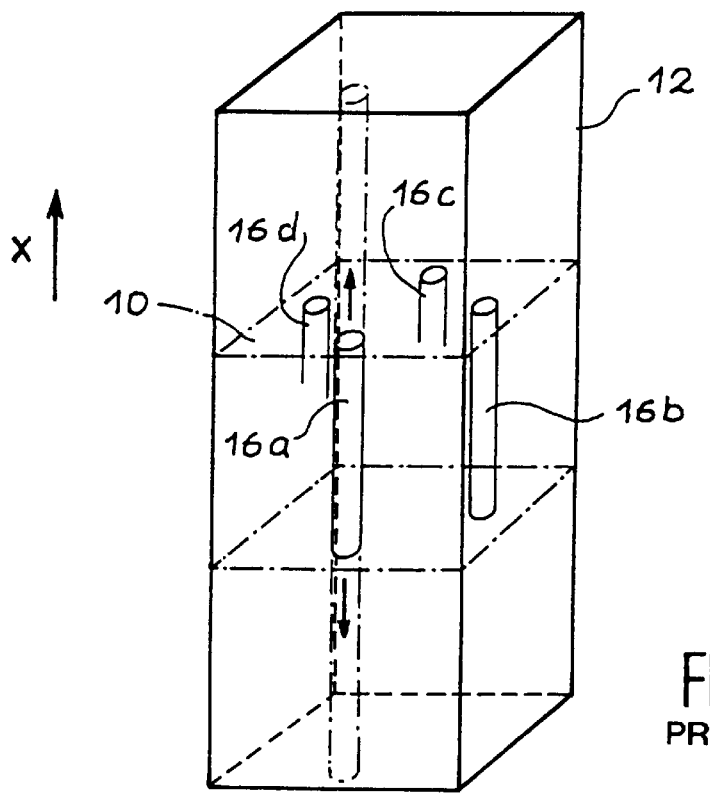
FIG. 2 is a simplified schematic illustration showing how the detectors in FIG. 1 slide in the compartment.
Figure 3:
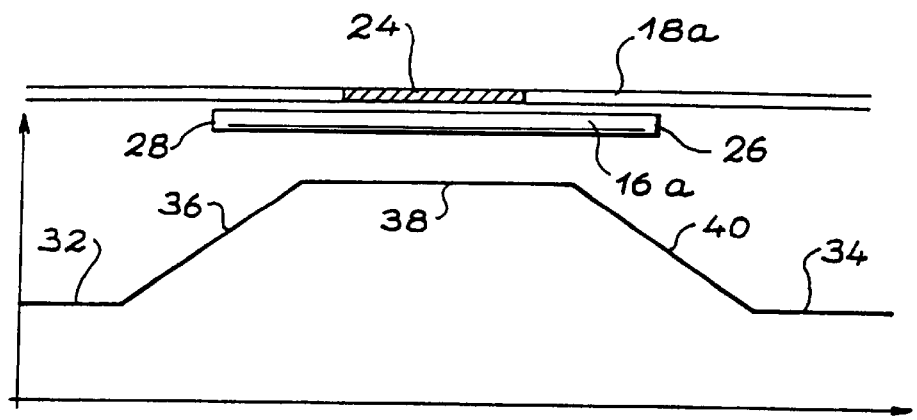
FIG. 3 shows a record of a signal from a detector according to FIGS. 1 and 2 as it passes in front of a defect in the compartment wall.
Figure 6A:
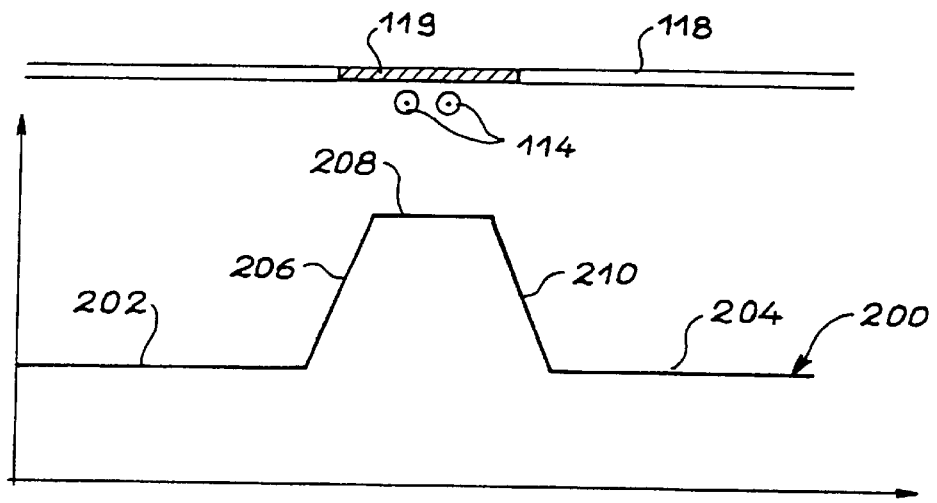
FIGS. 6A and 6B are theoretical record curves of inspection signals generated by the invention.
Figure 6B:
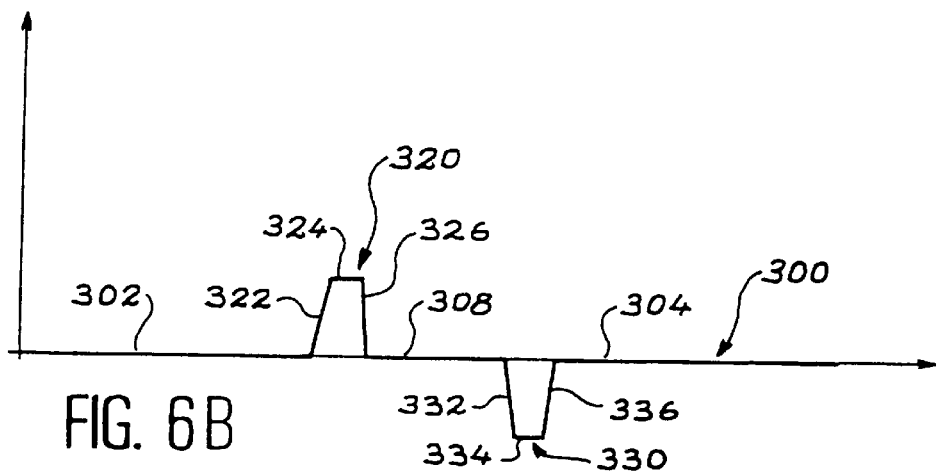

FIGS. 6A and 6B show record curves at an arbitrary scale of an inspection signal during the passage of a pair of detectors in front of a defect in the wall. The top part of FIG. 6A shows a wall 118 with a defect 119 and a pair of detectors 114 passing in front of the defect.

The signal in curve 200 in FIG. 6A corresponds to the sum of the detection signals from the two detectors in the pair of detectors.

The curve, read from left to right, corresponds to the displacement of the detection device according to the invention in front of a wall, from the bottom towards the top, in a nuclear fuel storage compartment.

Curve 200 contains portions 202 and 204 corresponding to the parts of the wall which have no defects and in which the quality of the neutron-absorbing material is constant and good. The signal from these portions of the curve corresponds to background noise and to the count of thermal neutrons that reach the detectors indirectly.

At the beginning of the wall defect area, the first detector counts an increase in the number of thermal neutrons before the second detector. Portion 206 of the curve corresponds to this increase in detected neutrons. Portion 208 in which the amplitude of the curve is highest corresponds to the maximum neutron count when both detectors in the pair are facing the defect. Finally, in portion 210 of the curve, the amplitude decreases as the detectors pass beyond the area of the defect.

The amplitude of the inspection signal, i.e., the sums of the signals from the two detectors, is inversely proportional to the thickness of the neutron-absorbing material in the wall, or the local efficiency of the absorbent.

Thus, if the measurement system is calibrated, for example, by carrying out measurements in a region in which the wall has no neutron-absorbing material, and then in a region in which the wall contains a known thickness of neutron-absorbing material, the thickness of the neutron-absorbing material can be measured at all points of the wall.

Similarly, the quality of the neutron-absorbing material can be determined.

FIG. 6B shows a record curve for an inspection signal equal to the difference between the signals from the two detectors when they pass in front of the defect in the wall.

When the two detectors are facing defect-free parts of the wall, they receive a small quantity of thermal neutrons, and the background noise detected in the two detectors is cancelled out by subtraction, except for statistical fluctuations. This is shown in portions 302 and 304 in curve 300. When the two detectors are facing the defect in the wall, each detects a maximum number of neutrons. However, when the detection signals are subtracted, the inspection signal also has a substantially zero amplitude. This is portion 308 in curve 6B.

Curve 300 also includes two discontinuities 320, 330 with opposite signs corresponding to the positions of the start and end of the wall defect. Each discontinuity includes a fast rising front 322, 332, followed by a constant portion 324, 334, and then a fast falling front 326, 336.

The lengths of the constant portions 324, 334 depend on the distance between the detectors.

The position of the defect may be measured precisely by identifying discontinuities 320 and 330 on the curve. Furthermore, the size of the measured defect between the starts of the falling fronts 326, 336 is determined very precisely.

Figure 7A:
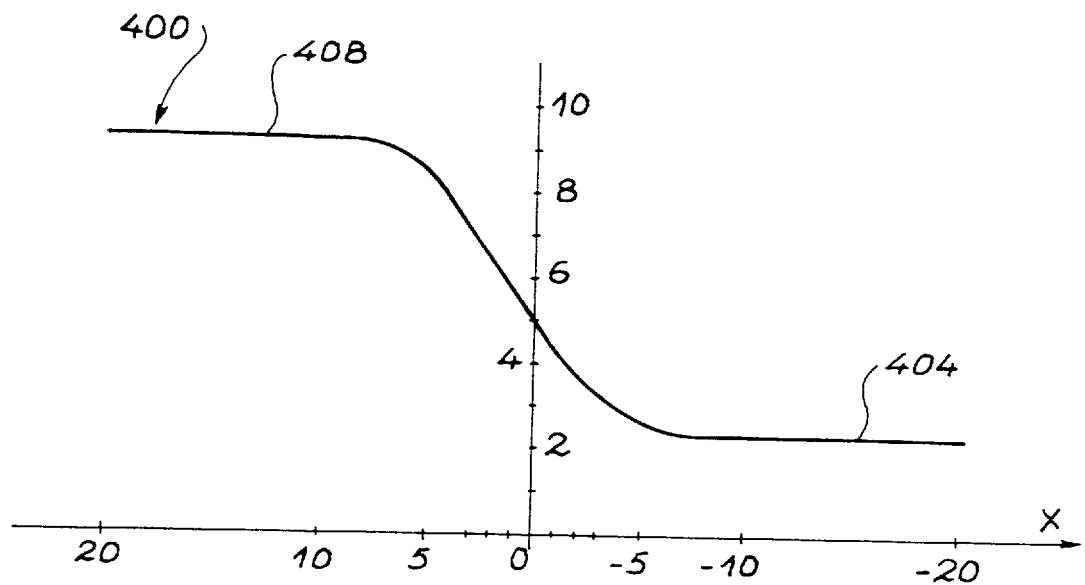
FIGS. 7A and 7B are record curves generated by the system shown in FIG. 5.
Figure 7B:
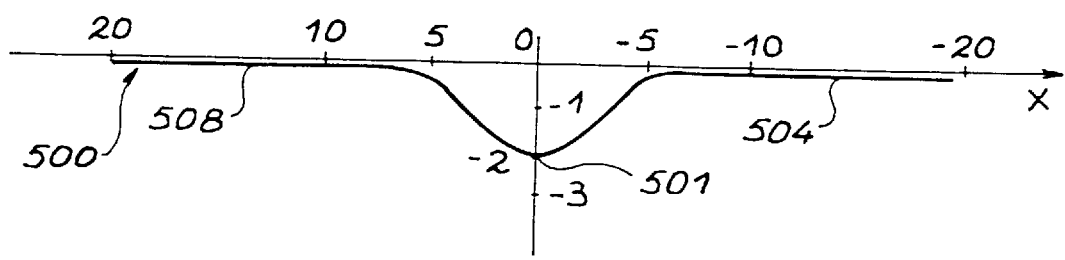

FIGS. 7A and 7B are curves corresponding to an additive and subtractive inspection signal respectively, recorded with a system according to the invention. The two detectors used are detectors with an outside diameter of 20 mm. They are mutually separated by a distance of 40 mm. Curves 400, 500 in FIGS. 7A and 7B show details of the transition between a defect free region in the wall, and a region in which the neutron-absorbing material is missing.

The ordinate on the charts in FIGS. 7A and 7B shows the start position of a defect in the wall. The distances on each side of this defect are given in centimeters. The amplitude of the signal (expressed in arbitrary units) corresponds to a sum (FIG. 7A) or a difference (FIG. 7B) of the number of neutrons detected in each detector in the pair of detectors.

References 404 and 504 identify portions of the curve in signals 400 and 500 respectively, in which detectors are facing a region in the wall in which the neutron-absorbing material is fully present. References 408 and 508 show portions of curves 400 and 500 in which the detectors are facing a defect.

Curve 400 in FIG. 7A, which corresponds to part of curve 200 in FIG. 6A, shows that the transition between parts 404 and 408 extends over a distance of 5 cm on each side of the boundary of the defect.

Curve 500 in FIG. 7B, which corresponds to part of curve 300 in FIG. 6B, shows a discontinuity centered on the boundary of the defective area of the wall. The limit of the defect is precisely defined by the inflection point 501 in curve 500, which can be easily determined.

Finally, with the invention, the magnitude, size and boundaries of a defect in the neutron-absorbing material can be determined precisely.

What is claimed is:

1. A system for the inspection of an absorption wall comprising a thermal neutron absorption material, the system comprising:
    (a) a detection device comprising a neutron source capable of emitting fast neutrons, and means for detecting thermal neutrons capable of outputting detection signals, the device being adapted to be placed facing a first side of the wall, and capable of being displaced along the wall along a displacement direction;
    (b) a thermalizing material adapted to be placed on one side of the wall, opposite the first side, to convert fast neutrons from the source into thermal neutrons;
    (c) means for processing detection signals; and
    (d) wherein said detecting means comprise at least one pair of oblong, substantially parallel thermal neutron detectors placed side by side, substantially perpendicular to said displacement direction, each detector being capable of outputting detection signals to said signal processing means to set up a wall inspection signal.

2. The system according to claim 1, wherein said signal processing means comprise an adder for detection signals output by each detector in the pair of detectors, to form an inspection signal that is a function of the sum of the detection signals.

3. The system according to claim 1, wherein said signal processing means comprise a subtractor for detection signals output by each of the detectors in the pair of detectors, to form an inspection signal that is a function of the difference between the detection signals.

4. The system according to claim 1, wherein said detection device includes a neutron diffuser located between the fast neutron source and thermal neutron detectors to increase the number of fast neutrons within an angle having a vertex at the center of the fast neutron source and intercepting the two thermal neutron detectors in each pair of detectors.

5. The system according to claim 1, wherein said thermal neutron detectors are in the shape of cylinders having a length of about 200 mm and an outside diameter of about 20 mm, and a spacing from one another of about 40 mm.

6. The system according to claim 1, wherein said neutron source is a neutron generator capable of emitting fast neutrons in response to electric impulses applied to it.

7. A detection device for inspection of a neutron absorption wall comprising a fast neutron source and means of detecting thermal neutrons, said device being capable of being moved along the wall in one direction of displacement, wherein said detecting means comprise at least one pair of oblong, substantially parallel thermal neutron detectors placed side by side, substantially perpendicular to the direction of displacement of the device along the wall, and wherein said device has a cross-section parallel to said thermal neutron detectors, adapted to an internal cross-section of a fuel storage compartment, so that the device can be moved along compartment walls within said compartment.

8. A process for inspecting a neutron absorption wall to determine a thickness of the thermal neutron absorption material, or a material absorption efficiency with an inspection system comprising a detection device comprising a neutron source capable of emitting fast neutrons, thermalizing material, and means for processing detection signals, said process comprising the steps of
    (a) moving said detection device along said neutron absorption wall;
    (b) recording an inspection signal proportional to the sum of detection signals from two detectors as a function of the position of the detection device along the wall; and
    (c) comparing the inspection signal with a reference signal to define the thickness of the neutron absorption material along the wall, or a material absorption efficiency.

* * * * *